United States Patent [19]

Nanyoshi et al.

[11] Patent Number: 5,016,591
[45] Date of Patent: May 21, 1991

[54] SYSTEM AND METHOD FOR CONTROLLING A COMBUSTION STATE IN A MULTI-CYLINDER ENGINE FOR A VEHICLE

[75] Inventors: Yasutoshi Nanyoshi, Hyogo; Hiroshi Komatsu, Kanagawa, both of Japan

[73] Assignee: Nissan Motor Company, Limited, Yokohama, Japan

[21] Appl. No.: 400,711

[22] Filed: Aug. 30, 1989

[30] Foreign Application Priority Data

Aug. 30, 1988 [JP] Japan .................. 63-217180

[51] Int. Cl.$^5$ ............................................. F02D 5/15
[52] U.S. Cl. .................................. 123/419; 123/436
[58] Field of Search ........................... 123/419, 436

[56] References Cited

U.S. PATENT DOCUMENTS

| | | | |
|---|---|---|---|
| 4,197,767 | 4/1980 | Leung | 123/436 |
| 4,475,511 | 10/1984 | Johnson et al. | 123/436 |
| 4,509,477 | 4/1985 | Takao et al. | 123/436 |
| 4,766,863 | 8/1988 | Fujimori | 123/436 |
| 4,883,038 | 11/1989 | Nakaniwa | 123/436 |

FOREIGN PATENT DOCUMENTS

59-201936 11/1984 Japan .
63-198473 12/1988 Japan .

Primary Examiner—Tony M. Argenbright
Assistant Examiner—Robert E. Mates
Attorney, Agent, or Firm—Foley & Lardner

[57] ABSTRACT

A system and method for controlling combustion state for an internal combustion engine during engine idling which measures the angular speed of the engine cylinders for a certain interval whenever a predetermined crank angle is reached, and detects a combustion state of a given cylinder in the combustion stroke when the engine is idling according to change in the angular speed. The system (method) also divides the engine cylinders into a plurality of cylinder groups, each group having a pair of engine cylinders, the angular speeds in each pair of engine cylinders (cylinder group) are compared and the ignition timing and/or fuel injection quantity is corrected so that the angular speed of the pair of cylinders (cylinder group) which is higher than that of the other cylinder groups is reduced and, for the pair of cylinders in which the angular speed is slower, corrects the ignition timing and/or fuel injection quantity in the reverse direction to the corrected ignition timing and/or fuel injection quantity by the same quantity so that balance between the angular speeds of the pairs of cylinders is taken, whereby the ignition timing and fuel injection quantity is corrected so that a total sum of the correction quantities for all cylinders in the case of the ignition timing and/or fuel injection quantity always becomes zero.

17 Claims, 10 Drawing Sheets

SYSTEM AND METHOD FOR CONTROLLING A COMBUSTION STATE IN A MULTI-CYLINDER ENGINE FOR A VEHICLE

FIELD OF THE INVENTION

The present invention relates to a system and method for controlling combustion state in a multi-cylinder engine for a vehicle and, more particularly, relates to a system and method which detect combustion variations for respective cylinders during engine idling and controlling combustion state for the respective cylinders so as to reduce engine vibration levels at the time of idling.

BACKGROUND OF THE ART

Recently, high performance requirements for internal combustion engines have increased. Mutually offsetting problems arise such that if the reduction of harmful exhaust gas is achieved, the engine output power is reduced and if the fuel consumption is conserved, engine output power is reduced. Therefore, it is required that the above-described mutually offsetting problems be solved to insure high performance while improving engine efficiency. One example of this problem can be exemplified in the case of engine idling. If engine vibrations at the time of idling can be reduced an improvement in the stability of engine operation can be achieved.

A Japanese Patent Application First Publication (unexamined) Showa 59-201936 published on Nov. 15, 1984 exemplifies a previously proposed combustion state controlling system for an internal combustion engine in which engine rotational speed is detected during the combustion stroke of each cylinder during engine idling, the rotation speeds of the respective engine cylinders are compared with the average engine revolution speed for all engine cylinders, and the fuel injection quantity for each cylinder is corrected so as to make the former approach the latter, in order to reduce engine vibrations.

A Japanese Utility Model Application First Publication (unexamined) showa 63-198473 published on Dec. 21, 1988 exemplifies another previously proposed combustion state controlling system in which the ignition timing for each cylinder is corrected rather than the fuel injection quantity described above.

The two above-described previously proposed combustion state controlling systems for internal combustion engines determine a correction quantity for each engine cylinder according to a difference between the engine rotation speed for each cylinder and average value of the rotational speed for all cylinders. Therefore, the correction quantities for all cylinders are uniformly deviated and the combustion state when the correction is carried out is controlled at a driving point which has been deviated from a target air-fuel mixture ratio or ignition timing determined on the basis of optimal cleanness of exhaust gas and engine driveability. That is to say, since a total sum of the correction quantity for each cylinder is not corrected so as to become equal to a target value, the air-fuel mixture ratio for all engine cylinders does not coincide with a target air-fuel mixture ratio. Consequently, the cleanness of the exhaust gas is reduced and idling engine revolutions are reduced due to the corrected ignition timing. Therefore, various improvements are desirable to overcome the above-described drawbacks.

SUMMARY OF THE INVENTION

It is an object of the present invention to provide a system and method for controlling the combustion state of an internal combustion engine which corrects a basic fuel injection quantity and/or basic ignition timing for each cylinder so that the total difference in change quantity of the rotational speed variations among all engine cylinders at the time of engine idling becomes zero, thus controlling the combustion state of all cylinders so as not to deviate from the driving point, that is, the point at which variation in the idling speed is suppressed and the cleanness of the exhaust gas is optimally maintained.

The above-described object can be achieved by providing a system for controlling combustion state during idling for a multi-cylinder engine, comprising: (a) first means for detecting engine operating conditions; (b) second means for detecting an engine idling state; (c) third means for detecting rotation of an engine crank shaft, the third means outputting a first signal by which a cylinder is identified by number during its combustion stroke, and a second signal corresponding to a predetermined unit crank angle; d) fourth means for the measuring angular speed a cylinder for a certain interval whenever a predetermined crank angle is reached and detecting the combustion state of a given cylinder during the combustion stroke according to change in its angular speed during engine idling; (e) fifth means for calculating change quantities of the angular speed for a predetermined interval with respect to the crank angle of each engine cylinder and for calculating correction quantities for the respective cylinders on the basis of the change quantities so that the difference between the change quantities assume a predetermined value; (f) sixth means for calculating a basic ignition timing on the basis of the engine operating conditions and for correcting the basic ignition timing for each engine cylinder according to the correction quantity calculated for that cylinder by the fifth means when the engine is transferred to an idling state; (g) seventh means for igniting the air-fuel mixture sucked into a cylinder at a timing based on the corrected basic ignition timing derived by the sixth means; (h) eighth means for calculating a basic fuel injection quantity on the basis of engine operating conditions and correcting the basic fuel injection quantity for each engine cylinder according to the correction quantity for the corresponding cylinder derived by the sixth means when the engine is transferred into an idling condition; and, i) ninth means for supplying fuel into an engine cylinder, the quantity of; which is determined according to the basic fuel injection quantity corrected by the eighth means.

The above-described object can also be achieved by providing a system for controlling combustion state for an internal combustion engine during engine idling, comprising: a) first means for detecting engine operating conditions; b) second means for detecting an engine idling state; c) third means for detecting rotations of an engine crankshaft, the third means outputting a first signal by which a cylinder is identified by number during its combustion stroke and a second signal corresponding to a predetermined unit crank angle; d) fourth means for measuring the angular speed of a cylinder for a certain interval whenever a predetermined crank angle is reached and detecting the combustion state of a given cylinder during its combustion stroke according to change in the angular speed when the engine is idling; e) fifth means for dividing the engine cylinders into a plurality of cylinder groups, each group including a pair of cylinders, for comparing angular speeds of each pair of engine cylinders to correct the ignition timing and/or fuel injection quantity so that the angular speed of a pair of cylinders which is higher than that of another cylinder group is reduced and, for a pair of cylinders in which the angular speed is slower than another cylinder group, correcting the ignition timing and/or fuel injection quantity to a higher rate, so the corrected ignition timing and/or fuel injection quantity for all cylinder groups is adjusted, positively or negatively, by the same quantity so that a balance between the angular speeds in all cylinder groups is achieved; (f) sixth means for comparing the angular speeds of all cylinder groups, for correcting the ignition timing and/or fuel injection quantity so that the angular speed of a cylinder group in which the angular speed is higher than that of another cylinder group is reduced and, for a cylinder group in which the angular speed is slower, correcting the ignition timing and/or fuel injection quantity in the reverse direction by the same quantity, so that a balance in the angular speed among all cylinder groups is achieved, the fifth and sixth means correcting the ignition timing and fuel injection quantity so that the total sum of the correction quantities for all cylinders always becomes zero.

The above-described object can also be achieved by providing a method for controlling combustion state for an internal combustion engine during engine idling, comprising the steps of: (a) detecting engine operating conditions; (b) detecting an engine idling state; (c) detecting rotations of an engine crankshaft, the third means outputting a first signal by which a cylinder is identified by number during its combustion stroke and a second signal corresponding to a predetermined unit crank angle; (d) measuring the angular speed of a cylinder for a certain interval whenever a predetermined crank angle is reached and detecting the combustion state of a given cylinder during its combustion stroke according to change in the angular speed when the engine is idling; (e) dividing the engine cylinders into a plurality of cylinder groups, each group including a pair of cylinders, for comparing angular speeds of each pair of engine cylinders to correct the ignition timing and/or fuel injection quantity so that the angular speed of a pair of cylinders which is higher than that of another cylinder group is reduced and, for a pair of cylinders in which the angular speed is slower than another cylinder group, correcting the ignition timing and/or fuel injection quantity to a higher rate, so the corrected ignition timing and/or fuel injection quantity for all cylinder groups is adjusted, positively or negatively, by the same quantity so that a balance between the angular speeds in all cylinder groups is achieved; (f) comparing the angular speeds of all cylinder groups, for correcting the ignition timing and/or fuel injection quantity so that the angular speed of a cylinder group in which the angular speed is higher than that of another cylinder group is reduced and, for a cylinder group in which the angular speed is slower, correcting the ignition timing and/or fuel injection quantity in the reverse direction by the same quantity, so that a balance in the angular speed among all cylinder groups is achieved, the steps (e) and (f) correcting the ignition timing and fuel injection quantity so that the total sum of the correction quantities for all cylinders always becomes zero.

BRIEF DESCRIPTION OF THE DRAWINGS

FIGS. 2 (a) through 2 (d) are waveform charts of signals utilized by the combustion state controlling system shown in FIG. 1.

FIGS. 5 (A) and 5 (B) are integrally a program flowchart for combustion control according to the system of FIG. 1.

DETAILED DESCRIPTION OF THE PREFERRED EMBODIMENT

Reference will hereinafter be made to the drawings in order to facilitate a better understanding of the present invention.

Figure 12:
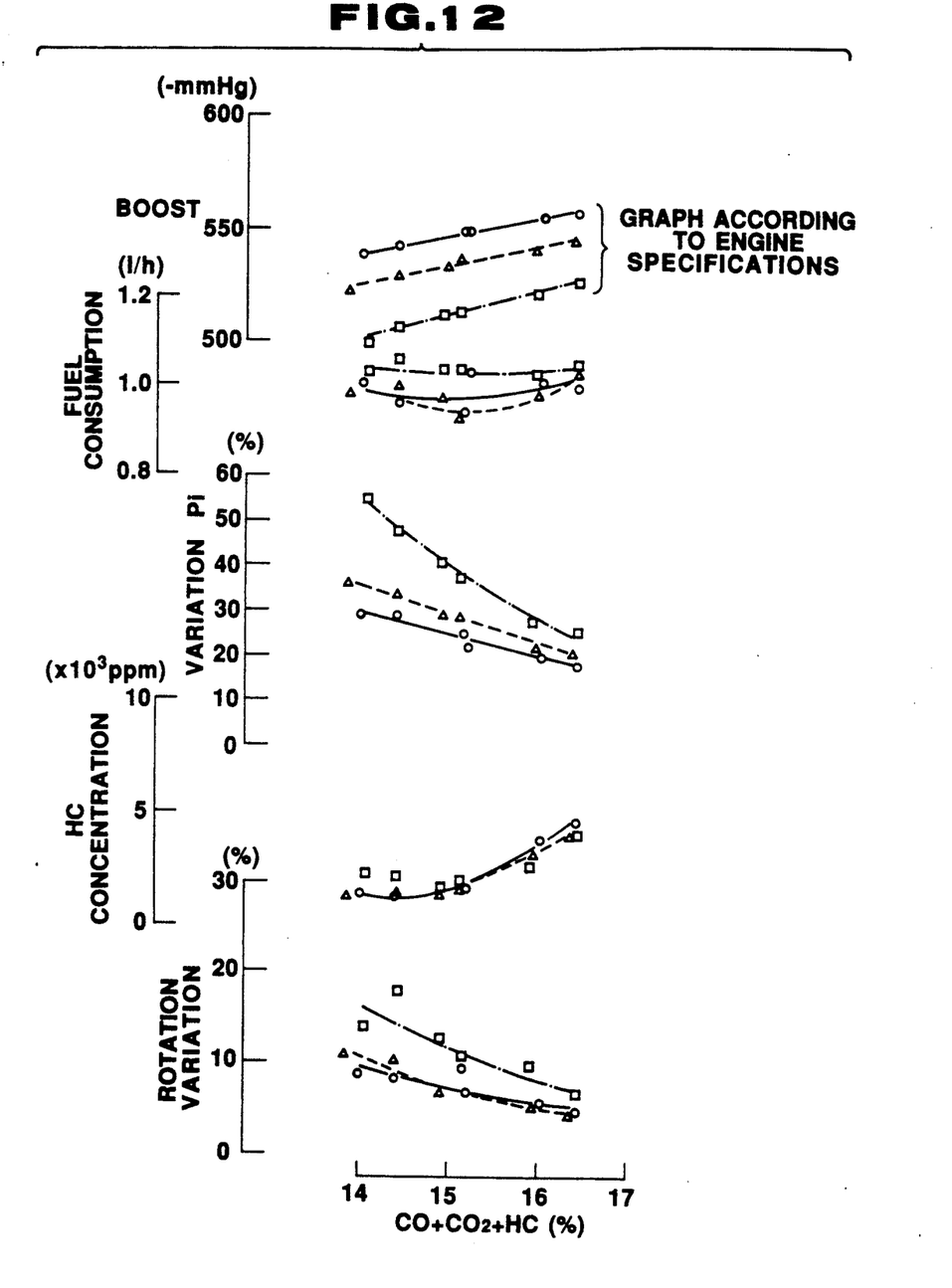
FIGS. 12 and 13 are explanatory views for explaining characteristics of two previously proposed combustion state controlling systems described in the Background of the Art.
Figure 13:
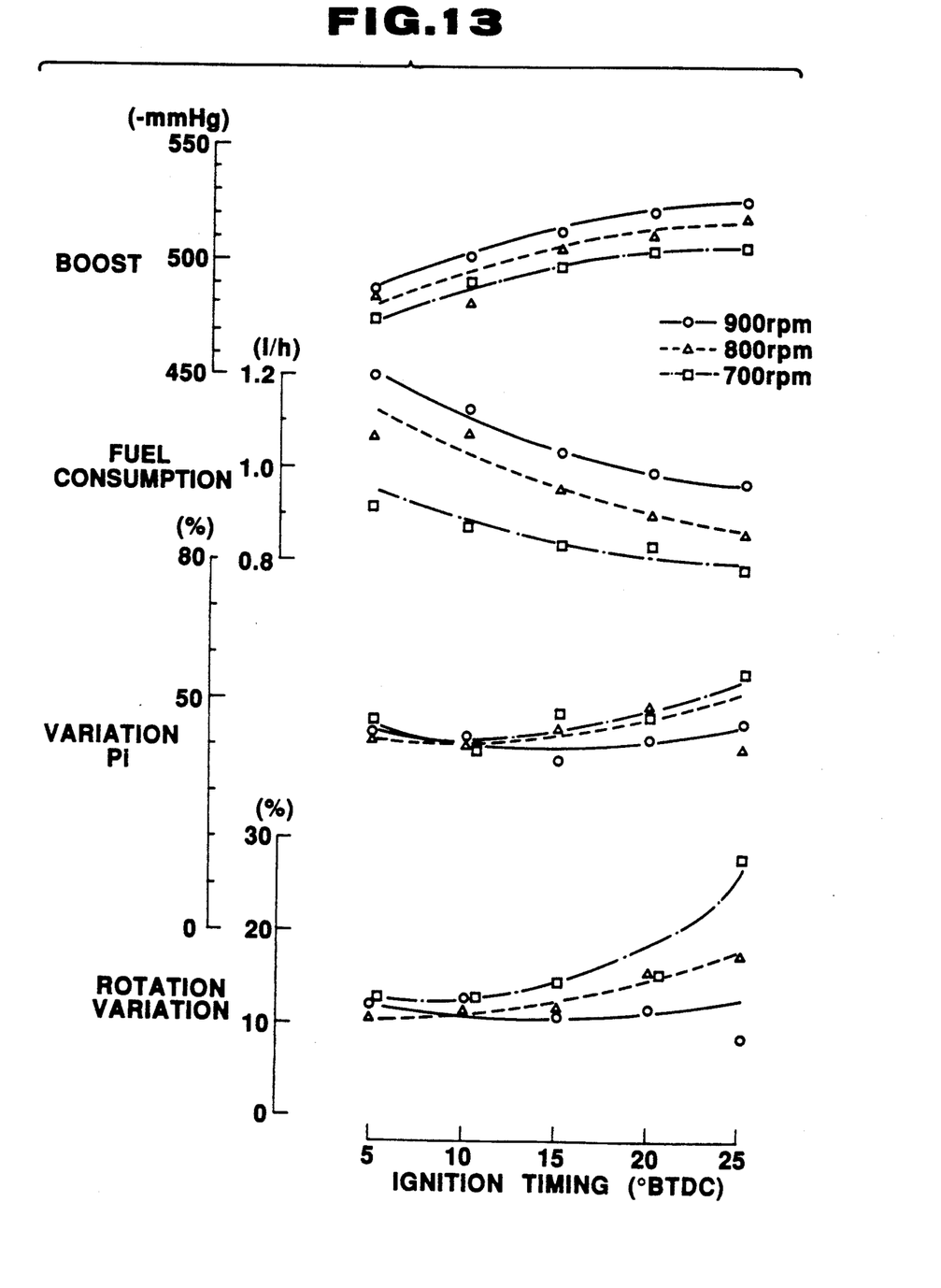

FIGS. 12 and 13 are graphs showing engine idling characteristics in two previously proposed combustion state controlling systems described in the Background of the Art with FIG. 12 showing air-fuel mixture ratio parameters and FIG. 13 showing the ignition timing parameters.

As shown in FIG. 12, as the rotational variation percentage is reduced in relation to the air-fuel mixture ratio (A/F), each cylinder is negatively deviated from the drive point. Since the air-fuel mixture ratio (A/F) is also controlled so as to be deviated below the optimal level, therefore, the A/F for each cylinder is as a whole moved to a richer mixture. For example, the air-fuel mixture ratio becomes approximately 1:12. When the air-fuel mixture ratio wholly becomes richer, not only do hydrocarbon concentrations (HC) become increased but also, the action of clarifying the exhaust gases by means of catalytic conversion is suppressed. Therefore, the cleanness of the exhaust gas becomes extremely reduced. In a case where the air-fuel mixture ratio becomes wholly rich, the idling RPMs become higher than at the time the engine started idling, with the air quantity remaining constant, as appreciated from the Boost graph in FIG. 12. The scale of numerical values along the horizontal axis of the graph are derived from numerical values on a scale of 0 to 29, for clarity 15 denotes an A/F ratio of 1:14; 17 indicates an A/F ratio of 1:12.

As shown in FIG. 13, as the average ignition timing deviation for each cylinder becomes reduced in relation to the drive point, the average ignition timing deviation for each cylinder is also reduced as the rotational variation percentage becomes reduced. Therefore, when the ignition timing is controlled so that the deviation from the drive point becomes negative, that is, a lower value than the drive point, the ignition timing for each cylinder becomes 5° through 10° BTDC (before top dead center), at which point rotational variation percentage becomes minimum causing fuel comsumption to increase. Also, when the engine is in an idling state the throttle valve is closed therefore the intake air quantity remains constant causing the ignition timing to be retarded for all cylinders. The engine torque is thereby reduced, meaning engine idling RPMs are brought below the drive point resulting in inefficient engine operation.

Figure 1:
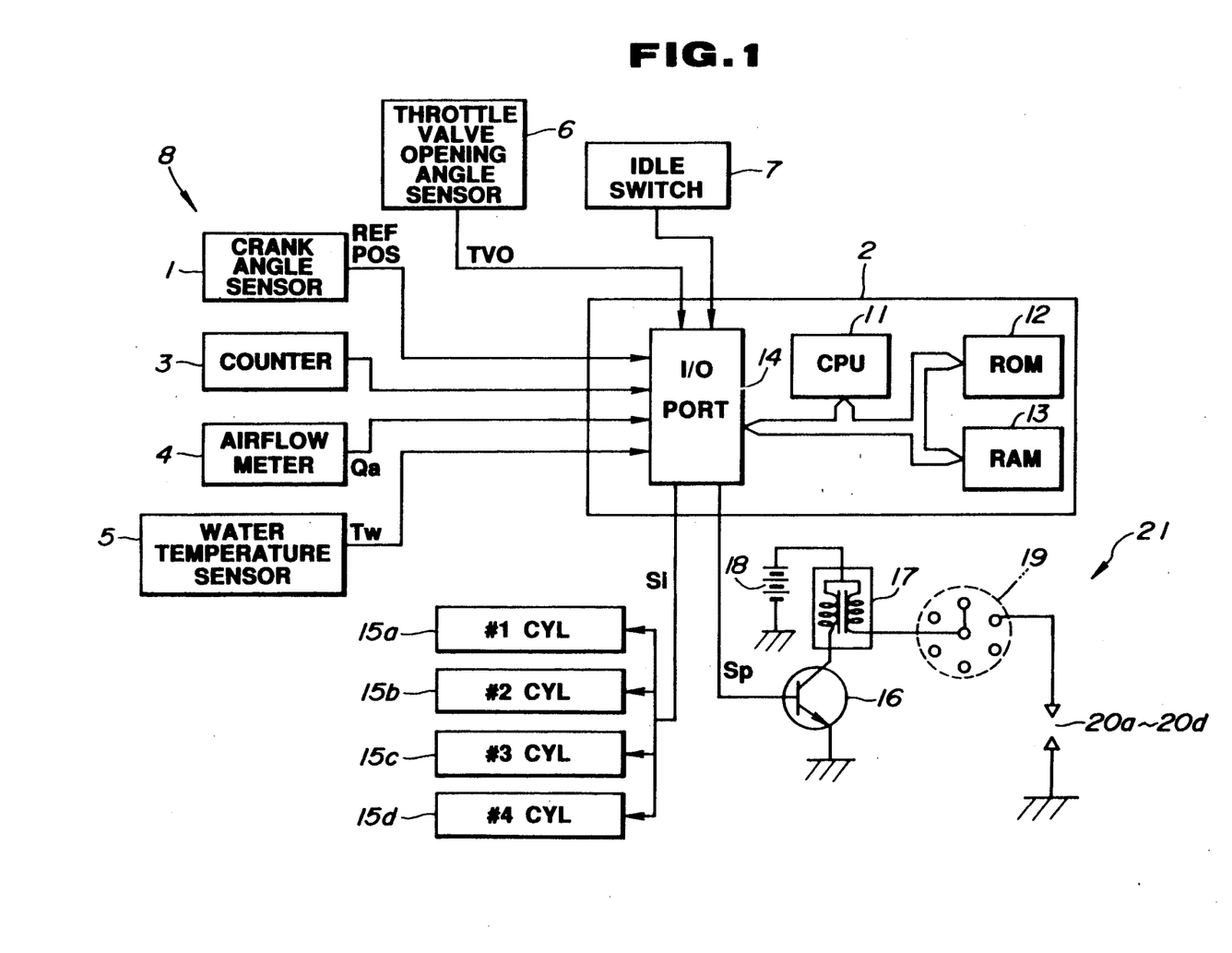
FIG. 1 is a block circuit diagram of a preferred embodiment of a combustion state controlling system according to the present invention.

FIG. 1 shows a combustion state controlling system in a preferred embodiment according to the present invention which is applicable to a four-cylinder engine.

Figures 2A, 2B:
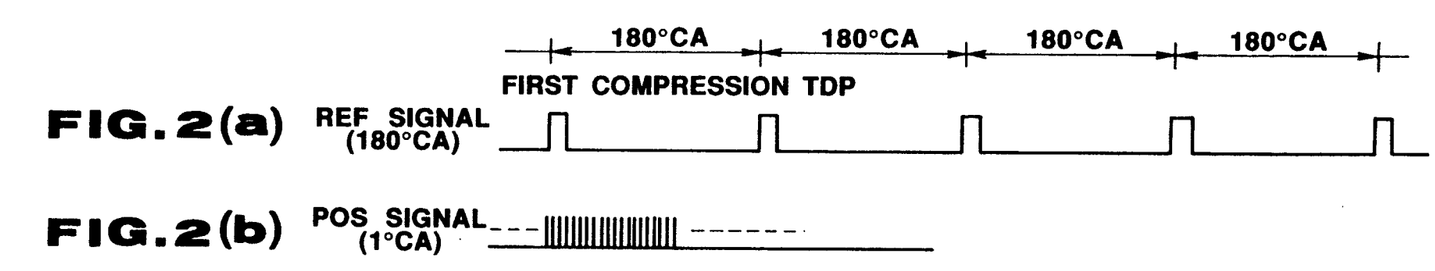
Figure 2C:
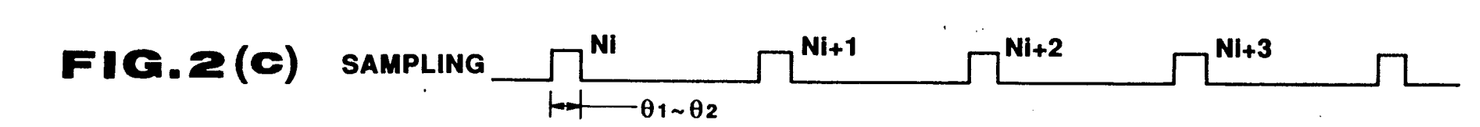

In FIG. 1, a crank angle sensor 1 is installed around an engine crankshaft for outputting a reference signal REF which provides a high level pulse when the crank angular position is at a predetermined position before a top dead center (TDC) in a compression stroke for each cylinder whenever an combustion interval is ended (180°) and outputting a unit angle signal POS which provides a high level pulse for each unit angle (,e.g., 1°) of the crank angle. The reference and unit angle signals REF and POS are transmitted to a control unit 2 (refer to FIGS. 2 (a) and 2 (b)). A 1-MHz counter 3 is installed to measure a time Ni between $\theta_1$ crank angle and $\theta_2$° crank angle, as shown in FIG. 2 (c).

An optimum interval of time for the above-described crank angles $\theta_1$ and $\theta_2$ is previously set according to optimal values determined through experiments. The set values can be arbitrarily changed through ROM data 12 in a control unit 2.

An airflow quantity $Q_a$ (an intake air quantity) is detected by an airflow meter 4 and a cooling water temperature $T_w$ flowing through a water jacket is detected by a water temperature sensor 5. An opening angle TVO of a throttle valve is detected by means of an opening angle sensor 6. It is noted that the engine idling condition is detected by means of an idle switch 7.

The control unit 2 executes the combustion control to be described later on the basis of various data derived from the sensors 1, 3, 4, 5, 6, and 7. The control unit 2 includes a microcomputer having a CPU 11, ROM 12, RAM 13, and I/O port 14.

The CPU 11 retrieves necessary external data from the I/O Port 14 in accordance with a program written into a ROM (Read Only Memory) 12, calculates and processes processing values necessary for the detection of the combustion state, receiving and transmitting the data from and to the RAM 13, and outputs the processed data to the I/0 port 14 according to necessity.

The ROM 12 stores a program, the basis of which is the operation of the CPU 11 whereby the CPU 11 is controlled an stores data used for calculation in a form of a table map. The I/0 port 14 receives the sensor signals from the sensors described above and outputs a fuel injection signal Si to injectors 15a through 15d or an ignition signal Sp to the base of a power transistor 16.

When an ignition signal is amplified at a base of a power transistor 16 the power supply to the collector of the power transistor 16 is interrupted, therefore the primary current derived from a battery 18 and supplied to an ignition coil 17 is also interrupted so that a high surge voltage Ai is generated at a secondary side of the ignition coil 17. The high surge voltage Ai is distributed to ignition plugs 20a, 20b, 20c, and 20d of the respective cylinders via a distributor 19.

The operating theory of the present invention will be described with reference to FIGS. 2 through 9.

Figure 5A:
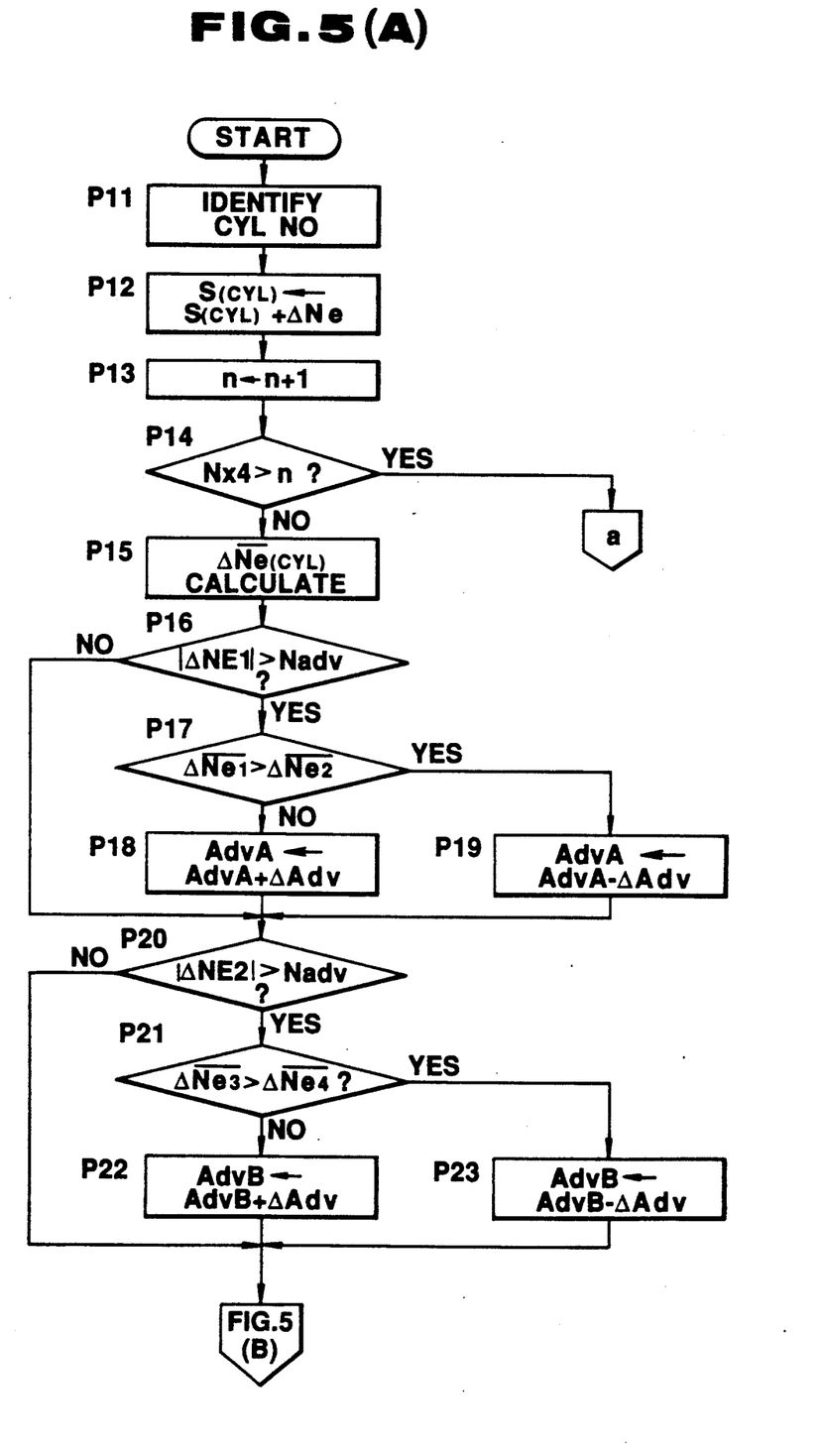
Figure 5B:
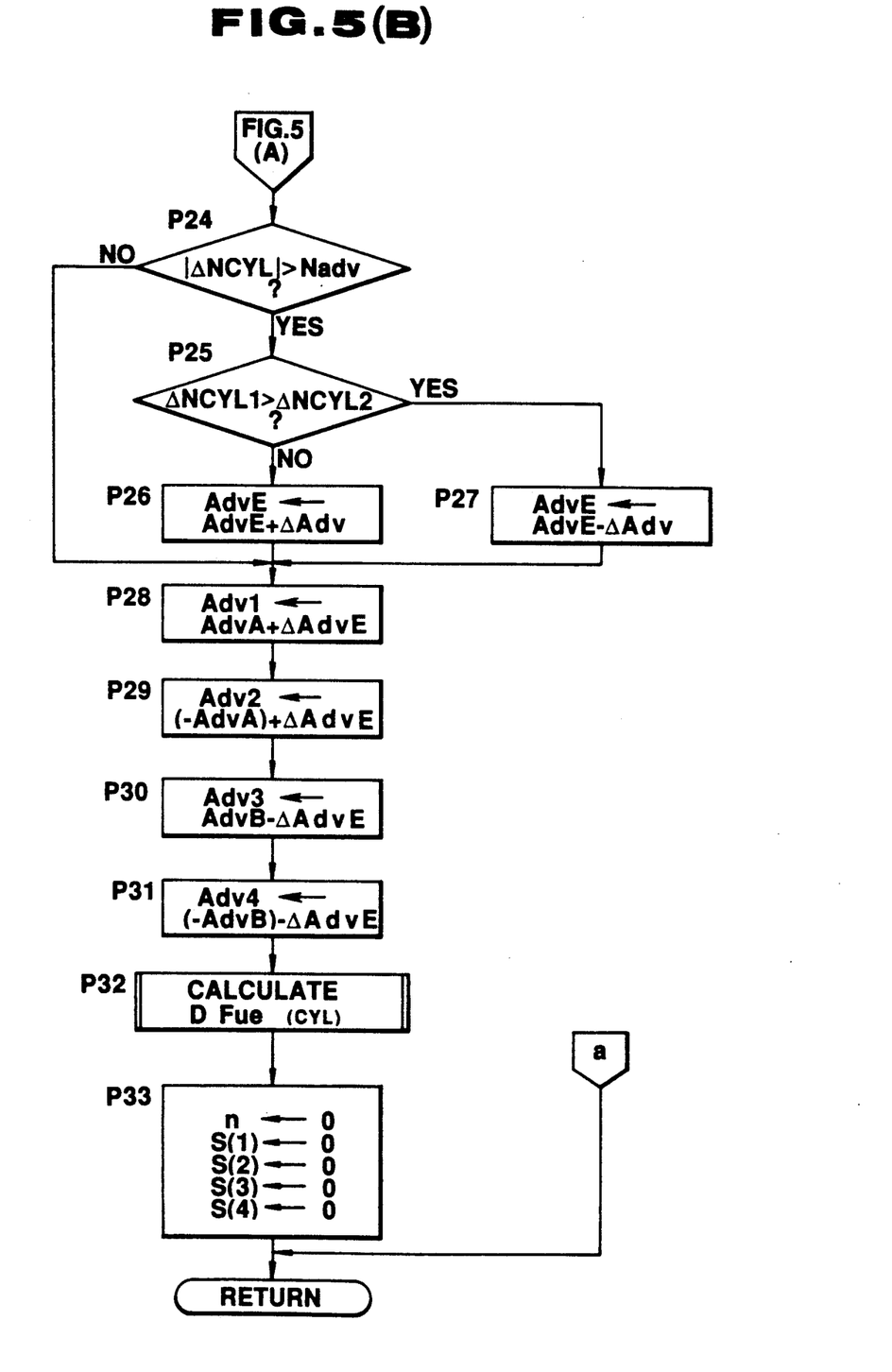

The engine rotation at the time of engine idling is largely affected by an indicated mean effective pressure Pi of the engine cylinders which are at combustion and explosion strokes between 180 degrees CA of the upper and lower dead centers. That is to say, although the combustion state at that time cannot be detected from the absolute value of the rotational number, the rotational variation for each 180° angle is measured as shown in FIG. 5 so that the indicated mean effective pressure Pi of a combusted cylinder can be detected.

Figure 6:
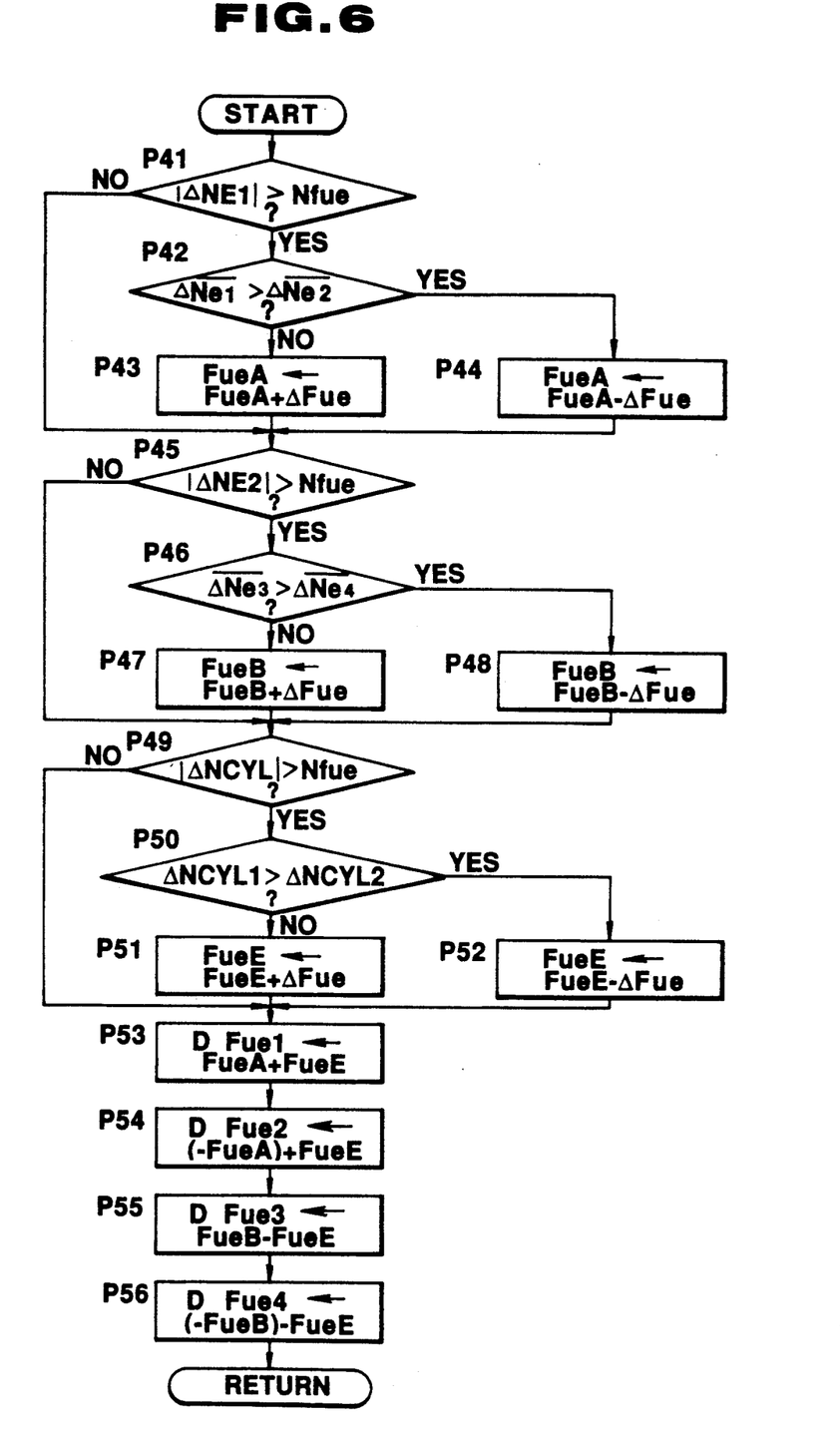
FIG. 6 is a program flowchart for deriving a fuel injection correction quantity.

FIG. 6 shows a program flowchart for detecting rotational vibration based on the above-described basic principle. The program shown in FIG. 6 is executed once in a predetermined interval.

Figure 2D:
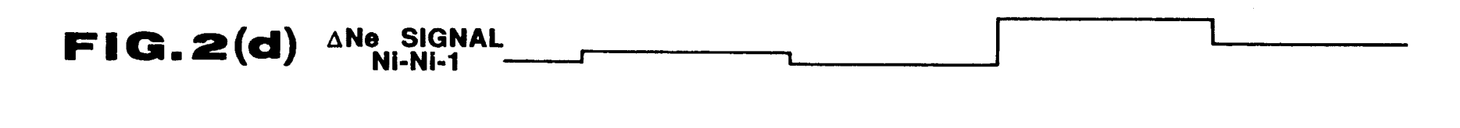
Figure 3:
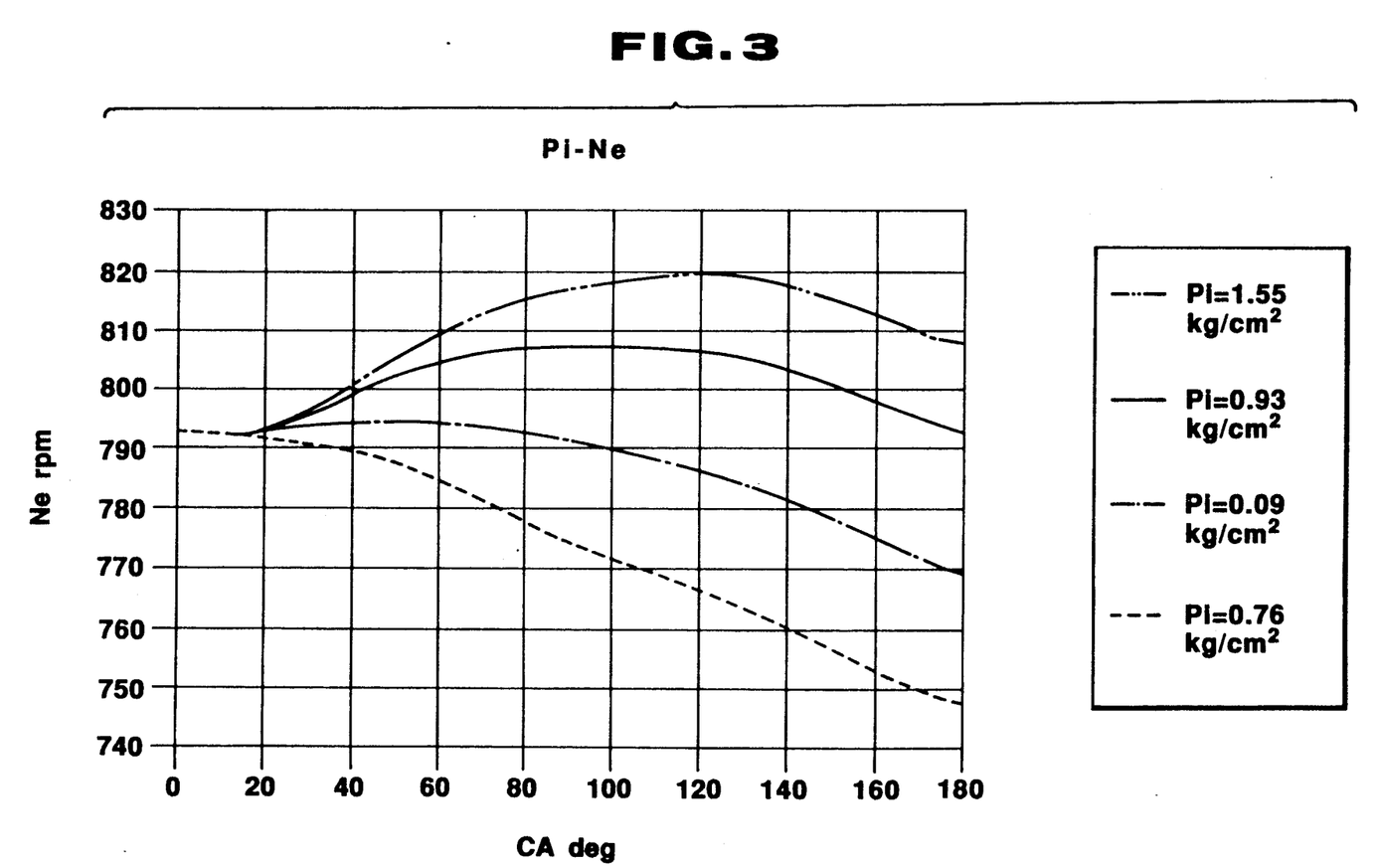
FIG. 3 is a characteristic graph for explaining the relationship between an indicated effective pressure and rotational variation.
Figure 4:
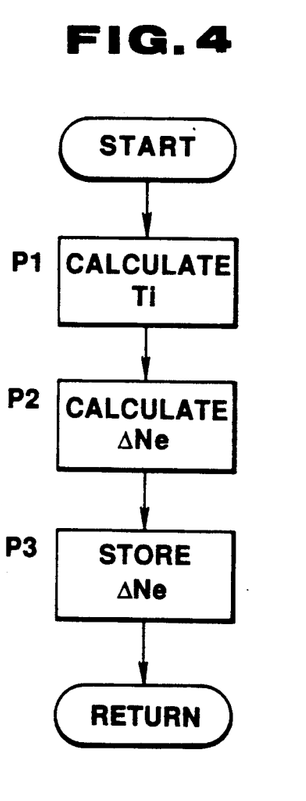
FIG. 4 is a program flowchart for explaining detection of an engine rotational variation $\Delta Ne$.

In a step P$_1$, a time Ti between $\theta_1$ and $\theta_2$° CA shown in FIG. 2 (c) is calculated in accordance with the following equation (1) through the counter 3 having a counting frequency of 1 MHz on the basis of the POS signal after the REF signal derived from the crank angle sensor 1. The CPU 11 calculates a change in the number of engine RPMs$\Delta$Ne (according to differences in angular speeds per revolution) in accordance with the following equation (2) from the time $T_i$ and a previous time $T_{i-1}$ before the time $T_i$ and (refer to FIG. 2 (d)). It is noted that $\Delta$Ne is changed at each 180° CA (crank angle) rotation and represents the instantaneous combustion state.

$$T_i = \theta_2 - \theta_1 \tag{1}$$

$$\Delta Ne = K/T_i - K/T_{i-1} \tag{2}$$

In the equation (2) K denotes a constant.

In a step P$_3$, the value of $\Delta$Ne is stored in a predetermined memory and the present processing is ended.

FIGS. 5 (A) and 5 (B) show a series of flowcharts indicating a combustion control routine.

The program shown in FIGS. 5 (A) and 5 (B) is executed at a timing after the measurement of an angular speed $\Delta$Ne in synchronization with engine revolution.

In a step P$_{11}$, the CPU 11 determines a number of engine cylinder which is in a combustion/expansion stroke.

In a step P$_{12}$, the CPU 11 accumulates the value of the angular speed $\Delta$Ne into a memory S$_{(CYL)}$ allocated for each cylinder number (CYL) (S$_{(CYL)}$←S$_{(CYL)}$+$\Delta$Ne).

In a step P$_{13}$, the CPU 11 counts incrementally the number of times the accumulation is carried out (n ←n+1). In a step P$_{14}$, the CPU 11 determines whether the number of times the accumulation is carried out for each cylinder reaches N. In the preferred embodiment, since the number of cylinders is four, (N×4; n). If N×4≦n, an average value delta Ne$_{(CYL)}$ for the N cycle for an angular speed $\Delta$Ne of each cylinder is calculated in accordance with the following equation (3) in a step $P_{15}$.

$$\Delta\overline{Ne}_{(CYL)}=S_{(CYL)}/N \quad (3)$$

If the number of cycles N taking an average of the angular speed ΔNe is a power of 2 (,e.g., 256 number of times), a quotient of the equation (3) can easily be derived through a shift operation of the microcomputer.

In steps $P_{16}$ through $P_{19}$, the CPU 11 calculates a correction quantity of the ignition timing so that a balance of the angular speed Ne between the first and second cylinders is determined.

In the step $P_{16}$, the CPU 11 determines whether an absolute value ($|\Delta\overline{Ne}_1-\Delta\overline{Ne}_2|=|\Delta NE1|$) of a difference between average values ΔNe, and $\Delta Ne_2$ at the first and second cylinders is larger than a predetermined value Nadv which represents a balance state between the average values $\overline{Ne}_1$ and $\overline{Ne}_2$. If $\Delta\overline{Ne}_1<\Delta\overline{Ne}_2$, the routine goes to the step $P_{18}$ in which ΔAdv is added to a correction quantity AdvA for the ignition timing which corrects an unbalanced state of the first and second cylinders (AdvA←AdvA+ΔAdv).

If $\Delta\overline{Ne}_1>\Delta\overline{Ne}_2$, the routine goes to a step $P_{19}$ in which ΔAdv is subtracted from AdvA (AdvA←AdvA−ΔAdv). Then, the routine goes to a step $P_{20}$. On the other hand, when $|NE1|\leq Nadv$ in a step $P_{16}$, the routine goes to the step $P_{20}$.

In steps $P_{20}$ through $P_{23}$, the CPU 11 calculates the correction quantity of the ignition timing in the same way as described above in order to take a balance of ΔNe of the angular speed between the third and fourth cylinders.

In the step $P_{20}$, the CPU 11 determines whether an absolute value ($|\Delta\overline{NE}_3-\Delta\overline{NE}_4|=|\Delta NE2|$) of a difference between average values $\Delta\overline{Ne}_3$ and $\Delta\overline{Ne}_4$ of the angular speed Ne between the third cylinder and fourth cylinders is greater than a predetermined value Nadv which determines whether both third and fourth cylinders are in the balanced state. If $|\Delta NE2|>Nadv$, the routine goes to a step $P_{21}$ in which the CPU 11 determines whether $\Delta\overline{Ne}_3$ is greater than $\Delta\overline{Ne}_4$. When $\Delta\overline{Ne}_3<\Delta\overline{Ne}_4$, ΔAdv is added to the correction portion AdvB of the ignition timing which corrects an unbalanced state between the third and fourth cylinders in the step $P_{22}$ (AdvB←AdvB+ΔAdv).

When $\Delta\overline{Ne}_3>\Delta\overline{Ne}_4$, the routine goes to a step $P_{23}$ in which ΔAdv is subtracted from AdvB (AdvB←AdvB−ΔAdv) and the routine goes to a step $P_{24}$. On the other hand, if $|NE2|\leq Nadv$ in the step $P_{20}$, the routine goes to a step $P_{24}$.

In the step $P_{24}$, the CPU 11 determines whether an absolute value $|\Delta NCYL|$ of a difference between an average value ΔNCYL1 of the angular speed ΔNe in the cylinder group of the first and second cylinders and an average value ΔNCYL2 of the angular speed ΔNe of the cylinder group of the third and fourth cylinders is greater than the predetermined value Nadv which determines the balanced state in the cylinder groups.

$$|(\Delta\overline{Ne}_1+\Delta\overline{Ne}_2)/2-(\Delta\overline{Ne}_3+\Delta\overline{Ne}_4)/2|>Nadv \quad (4)$$

Provided that $|\Delta NCYL|:|(\Delta\overline{Ne}_1+\Delta\overline{Ne}_2)/2-(\Delta\overline{Ne}_3+\Delta\overline{Ne}_4)/2|$ ΔNCYL 1: $(\Delta\overline{Ne}_1+\Delta\overline{Ne}_2)/2$ ΔNCYL 2: $(\Delta\overline{Ne}_3+\Delta\overline{Ne}_4)/2$ If $|4NCYL|>Nadv$, the routine goes to a step $P_{25}$ in which the CPU 11 determines whether ΔNCYL 1 is equal to or greater than ΔNCYL2. If ΔNCYL1<ΔNCYL2, the routine goes to a ste $P_{26}$ in which ΔAdv is added to the correction portion AdvE of the ignition timing correction which corrects the balanced state of the cylinder group (AdvE←AdvE+ΔAdv). If NCYL1>NCYL2, Adv is subtracted from AdvE (AdvE←AdvE−ΔAdv) and the routine goes to a step $P_{28}$. On the other hand, when $|\Delta NCYL|<Nadv$ in the step $P_{24}$, the routine goes to a step $P_{28}$.

If $|\Delta NCYL|<Nadv$, the routine goes to a step $P_{28}$.

The CPU 11 calculates the ignition timing correction quantity Dadv1 through Dadv4 for each cylinder in steps $P_{28}$ through $P_{31}$.

An unbalanced correction portion AdvA between the first and second cylinders is added to the first cylinder of the step $P_{28}$ and is subtracted from the second cylinder (DAdv2←(−AdvA)+AdvE). In the same way, the unbalanced correction portion AdvB between the third and fourth cylinders is added to the third cylinder of the step $P_{30}$ and is subtracted from the fourth cylinder (DAdv4<←(−AdvB) AdvE). The ignition timing correction portion AdvE which corrects the unbalanced state in the cylinder group is added in the first and second cylinders and is subtracted from the third and fourth cylinders (DAdv1←AdvA+AdvE, DAdv3←AdvB−A).

Next, in the same calculation method as the correction quantities Dadv 1 through Dadv 4, the CPU 11 calculates fuel injection correction quantities DFue 1 through Dfue 4 in a step $P_{32}$. In a step $P_{33}$, the routine is ended with the counter n for counting the number of times the accumulation is carried out and the accumulated memories S (1) through S (4) of the angular speed ΔNe being cleared to zero (0), respectively. On the other hand, the present routine is ended when N×4>n in the step $P_{14}$.

FIG. 6 shows a program flowchart for deriving a fuel injection quantity, in which the fuel injection correction quantities DFue 1 through DFue 4 are calculated in the same calculation method as the steps $P_{16}$ through $P_{31}$.

In a step $P_{41}$, the CPU 11 determines whether an absolute value $|\Delta NE1|$ of a difference between the average value $\Delta\overline{Ne}_1$ and average value $\Delta\overline{Ne}_2$ of the angular speed ΔNe in the first and second cylinders is greater than a predetermined value NFue which determines the balanced state of the first and second cylinders. If $|\Delta NE1|>NFue$, the routine goes to a step $P_{42}$ in which the CPU 11 determines whether $\Delta\overline{Ne}_1$ is greater than $\Delta\overline{Ne}_2$. If $\Delta\overline{Ne}_1<\Delta\overline{Ne}_2$, the routine goes to a step $P_{43}$ in which ΔFue is added to the correction portion FueA of the fuel injection quantity which corrects the unbalanced state between the first and second cylinders (FueA←FueA+ΔFue). When $\Delta\overline{Ne}_1>\Delta\overline{Ne}_2$, the routine goes to a step $P_{44}$ in which ΔFue is subtracted from FueA in a step $P_{44}$ (FueA←FueA−ΔFue) in th step $P_{44}$ and the routine goes to a step $P_{45}$.

On the other hand, when the CPU 11 determines that $|\Delta NE1|\leq NFue$, the routine goes to a step $P_{45}$.

In the step $P_{45}$, the CPU 11 determines whether an absolute value $|\Delta NE2|$ of a difference between the average value $\Delta\overline{Ne}_3$ and $\Delta\overline{Ne}_4$ of the angular speed ΔNe in the third and fourth cylinders is greater than a predetermined value NFue which determines the balanced state of the third and fourth cylinders. If $|\Delta NE2| > $ NFue, the routine goes to a step $P_{46}$ to determine whether $\Delta \overline{Ne}_3$ is greater than $\Delta \overline{Ne}_4$. If $\Delta \overline{Ne}_3 < \Delta \overline{Ne}_4$, $\Delta$Fue is added to the correction portion FueB of the fuel injection quantity which corrects the unbalanced state between the third and fourth cylinders (FueB←FueB−$\Delta$Fue). If $\Delta \overline{Ne}_3 > \Delta \overline{Ne}_4$, the routine goes to a step $P_{49}$. On the other hand, when $|\Delta NE2| < $ NFue in the step $P_{45}$, the routine goes to a step $P_{49}$, in which the CPU 11 determines whether an absolute value $|\Delta Ne|$ of a difference between an average value $\Delta$NCYL1 of the angular speed $\Delta$Ne in the first and second cylinder group and an average value $\Delta$NCYL2 of the angular speed $\Delta$Ne in the third and fourth cylinder groups is greater than the above-described predetermined value NFue. If $|\Delta NCYL| > $ NFue, the routine goes to a step $P_{50}$ in which the CPU 11 determines whether $\Delta$NCYL1 is greater than $\Delta$NCYL2. If $\Delta$NCYL1 $< \Delta$NCYL2, $\Delta$Fue is added to the fuel injection correction quantity FueE which corrects the unbalanced state between the cylinder groups (FueE←FueE+$\Delta$Fue). If $\Delta$NCYL1 $> \Delta$NCYL2, $\Delta$Fue is subtracted from FueE (FueE←FueE−$\Delta$Fue) and the routine goes to a ste $P_{53}$. If $|NCYL| \leq $ NFue in the step $P_{49}$, the routine goes to step $P_{53}$.

The fuel injection correction quantities for the respective cylinders DFue1 through DFue4 are calculated. The correction portion FueA which corrects the unbalanced state in the first and second cylinders is added to the first cylinder in the step $P_{53}$ (DFuel ←(−FueA)+FueE) and is subtracted in the second cylinder (DFue2←(−FueA)+FueE). In the step $P_{55}$, the correction portion FueB which corrects the unbalanced state in the third and fourth cylinders is added in the step $P_{55}$ (DFue3←FueB−FueE) and is subtracted in the fourth cylinder in the ste $P_{56}$ (DFue4←(−FueB)−FueE). The present routine is ended.

Figure 7:
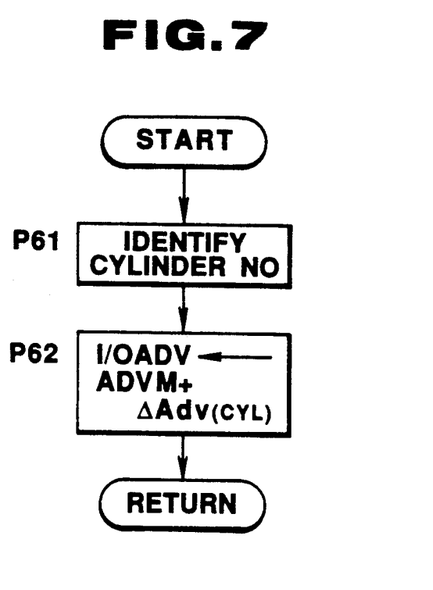
FIG. 7 is a flowchart for outputting an ignition signal Sp shown in FIG. 1.

FIG. 7 shows a program flowchart to output an ignition signal.

The program shown in FIG. 7 is executed for reference crank angle. In a step $P_{61}$, the CPU 11 determines the cylinder number in which the ignition of fuel is carried out (cylinder signal=CYL). In a step $P_{62}$, the correction quantity DAdv$_{(CYL)}$ for each cylinder is added to a basic ignition timing ADVM stored in an ignition timing set register ADV located in the I/O 14 in a step $P_{62}$ calculated according to a program for executing a basic ignition timing calculation program (not shown).

Figure 8:
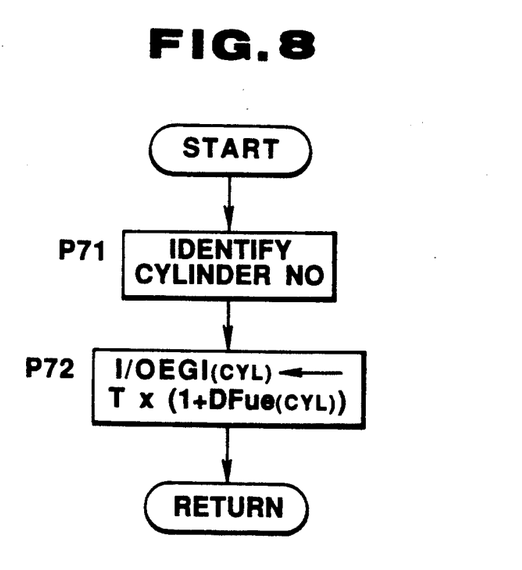
FIG. 8 is a flowchart for outputting a fuel injection pulse Si shown in FIG. 1.

FIG. 8 shows a program flowchart for outputting a fuel injection pulse. The program is executed for each predetermined crank angle. In a step $P_{71}$, the CPU 11 determines whether the cylinder number at which the fuel injection is carried out (Cylinder number: CYL) is determined. In a step $P_{72}$, the fuel injection correction quantity DFue$_{(CYL)}$ for each cylinder [%] is added to the fuel injection pulsewidth $T_E$ calculated according to a basic injection pulsewidth setting register EGI$_{(CYL)}$ corresponding to each cylinder and installed in the I/O 14 in a step $P_{72}$.

In a step $P_{17}$ of FIG. 5, the CPU 11 compares an average value $\Delta \overline{Ne}_1$ with an average value $\Delta \overline{Ne}_2$ in first and second cylinders in a step $P_{17}$ of FIG. 5. If $\Delta \overline{Ne}_1 < \Delta \overline{Ne}_2$, the routine goes to a step $P_{18}$ in which the CPU 11 increments the ignition timing correction portion AdvA. When AdvA is increased, the first cylinder ignition timing angle is advanced and the second cylinder ignition timing angle is retarded by the same angle through the calculations of the steps $P^{28}$ and $P_{29}$.

Thus, the generation torque in the first cylinder is increased and the generation torque in the second cylinder is reduced so that $\Delta \overline{Ne}_1$ is reduced and $\Delta \overline{Ne}_2$ is increased. In the case where $\Delta \overline{Ne}_1 > 66 \overline{Ne}_2$, the operation is executed vice versa.

In the same way, the ignition timing is corrected to provide a balance between average values $\Delta \overline{Ne}_3$ and $\Delta \overline{Ne}_4$ of the angular speed $\Delta \overline{Ne}$ in the third cylinder in the steps $P_{24}$ through $P_{27}$. Furthermore, the ignition timing is corrected to take a balance between an average value $(\Delta \overline{Ne}_1 + \Delta \overline{Ne}_2)/2$ of the $\Delta$Ne in the cylinder group of the first and second cylinders and an average value $(\Delta \overline{Ne}_3 + \Delta \overline{Ne}_4)/2$ of the angular speed $\Delta$Ne in the cylinder group of the third and fourth cylinders.

Figure 9:
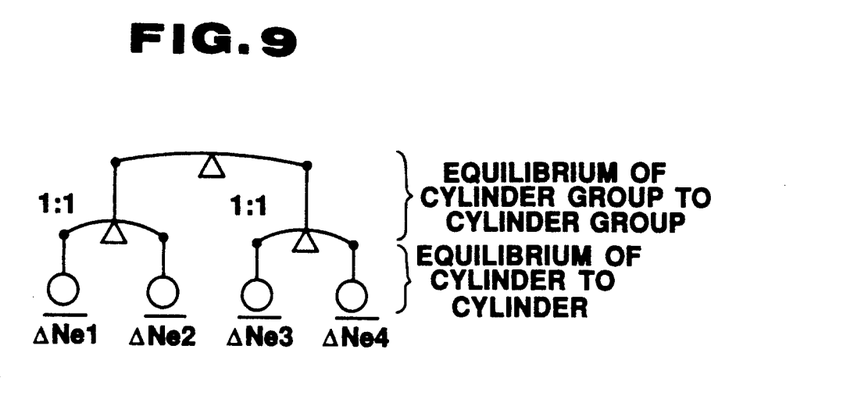
FIG. 9 is an explanatory view for explaining the mutual relationship of rotational variations between respective engine cylinders.

The above-described action will be shown diagramatically in FIG. 9.

The ignition timing is corrected so as to make the values of $\Delta \overline{Ne}_1$, $\Delta \overline{Ne}_2$, $\Delta \overline{Ne}_3$, and $\Delta \overline{Ne}_4$ equal to each other. In addition, the total sum of ignition timing correction quantities DAdv1 through DAdv4 and that of fuel injection correction quantities DFuel through DFue4 can always be set to zero.

Hence, when the total of the correction quantities for the respective cylinders is always set to zero, the driving point when the corrections of fuel injection quantity and/or ignition timing are carried out coincides with the target air-fuel mixture ratio and ignition timing so that the reduction of cleanness in the exhaust gas and variation of the idling rotational speed can be suppressed.

In the preferred embodiment, the four cylinder engine is exemplified.

In the previously proposed combustion state controlling methods described in the Background of the art, the following defects are observed since the total sum of the correction quantities for the respective cylinders does not indicate zero.

(1). When the correction of fuel injection quantity is carried out, the whole air-fuel mixture ratio for all cylinders does not become coincident with the target air-fuel mixture ratio and consequently the cleanness of exhaust gas is worsened. In addition, an average ignition timing for all cylinders and an average air-fuel mixture ratio are changed from an original value so that the idling rotational speed is changed.

(2). In a worst case, the correction values for all cylinders are, for example, deviated in a direction toward which the air-fuel mixture ratio becomes richer and/or the ignition timing becomes retarded since the rotational speed variation during engine idling has a characteristic such as to make the air-fuel mixture ratio richer and to make the ignition timing retard as the rotational speed variation becomes small.

Since during engine idling the driving point is usually defined from the air-fuel mixture ratio and ignition timing in view of the engine driveability and exhaust gas cleanness, it is desirable to avoid deviation from the target driving point.

Figure 10:
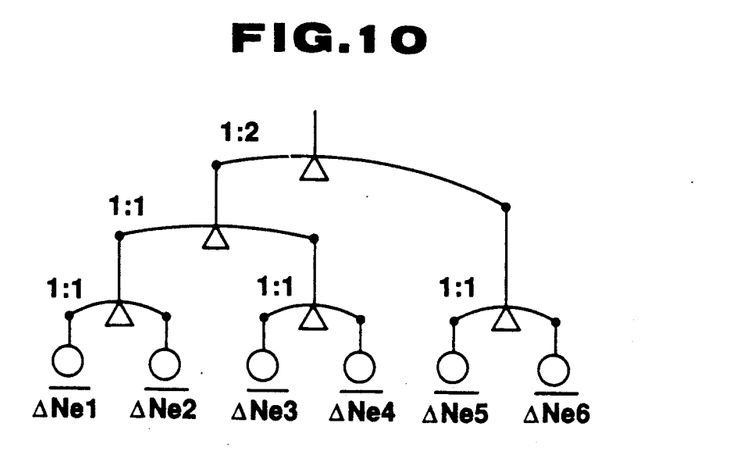
FIG. 10 is an explanatory view for explaining the mutual relationship between rotational variations in the cylinders of a six-cylinder engine.
Figure 11:
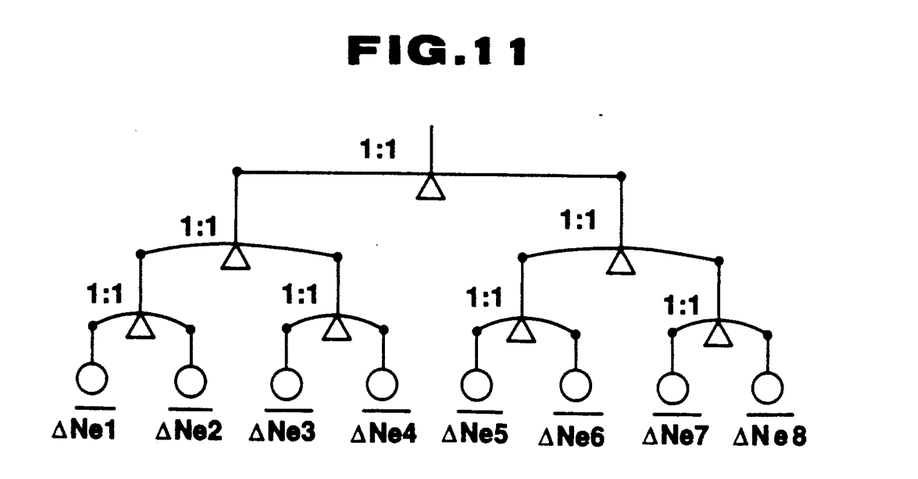
FIG. 11 is an explanatory view for explaining the mutual relationship between rotational variations in the cylinders of an eight-cylinder engine.

As shown in FIGS. 10 and 11, the present invention is applicable to other multi-cylinder engines, e.g., six-cylinder or eight-cylinder engines.

As described hereinabove, since in the combustion controlling system and method according to the present invention, a basic ignition timing and basic fuel injection quantity for each engine cylinder are corrected so that a difference between change quantities of the rotational variation in between the mutual cylinders at the time of idling becomes zero, the combustion states for all cylinders are controlled so as not to deviate from a target driving point. Then, the reduction of cleanness in the exhaust gas and variation of the idling revolutions can be suppressed.

It will be fully appreciated by those skilled in the art that the foregoing description is made in terms of the preferred embodiments and various changes and modifications may be made without departing from the scope of the present invention which is to be defined by the appended claims.

What is claimed is:

1. A system for controlling combustion state during idling for a multi-cylinder engine, comprising:
   (a) first means for detecting engine operating conditions;
   (b) second means for detecting an engine idling state;
   (c) third means for detecting rotations of an engine crank shaft, the third means outputting a first signal by which a cylinder in a combustion stroke is identified by number, and a second signal corresponding to a predetermined unit crank angle;
   (d) fourth means for measuring an angular speed for a certain interval whenever a predetermined crank angle is reached and detecting a combustion state of one of the cylinders in the combustion stroke according to a change in the angular speed when the engine is idling;
   (e) fifth means for calculating change quantities of the angular speed for a predetermined interval with respect to the crank angle for each engine cylinder and for calculating correction quantities for the respective cylinders on the basis of the change quantities so that a difference between the change quantities for the respective cylinders become a predetermined value;
   (f) sixth means for calculating a basic ignition timing on the basis of the engine operating conditions and for correcting the basic ignition timing for each engine cylinder according to one of the correction quantities for the corresponding cylinder derived by the fifth means when the engine is transferred to an idling condition;
   (g) seventh means for igniting air-fuel mixture sucked into the corresponding cylinder at a timing based on the corrected basic ignition timing derived by the sixth means;
   (h) eighth means for calculating a basic fuel injection quantity on the basis of the engine operating conditions and correcting the basic fuel injection quantity for each engine cylinder according to the correction quantity for the corresponding cylinder derived by the fifth means when the engine is transferred into an idling condition; and
   (i) ninth means for supplying fuel into the corresponding engine cylinder, the quantity of which is determined according to the basic fuel injection quantity corrected by the eighth means.

2. A system as set forth in claim 1, wherein the fourth means measures a time duration Ti between a first crank angular position $\theta_1$ and a second crank angular position $\theta_2$, calculates a change in the number of revolutions per time, a difference in the angular speed Ne using the following equations:

$$Ti = \theta_2 - \theta_1 \quad (1)$$

$$\Delta Ne = K/Ti - K/T_{i-1} \quad (2)$$

wherein K denotes a constant, $T_{i-1}$ denotes Ti derived one combustion stroke before the present combustion stroke.

3. A system as set forth in claim 2, wherein the fifth means calculates an average value $\Delta Ne$ for N cycles of the engine revolutions for each cylinder: $\Delta \overline{Ne} = \Delta Ne/N$; and stores the average value $\Delta Ne$ into a memory location according to the number of cylinders CYL to accumulate the value of $\Delta \overline{Ne}$.

4. A system as set forth in claim 3, wherein the fifth means counts the number of times n the accumulation is carried out, determines whether the number of times the accumulation of $\Delta \overline{Ne}$ is carried out has reached N number of times, and calculates an average value of $\Delta \overline{Ne}$ per cycles, $\Delta \overline{Ne}_{(CYL)}$.

5. A system as set forth in claim 4, wherein the number of cycles N averaging $\Delta Ne$ is a predetermined power of 2.

6. A system as set forth in claim 5, wherein the number of cylinders is four and wherein the fifth means compares the average values of $\Delta \overline{Ne}$ in first and second cylinders, determines whether an absolute value, of a difference between the average values $\Delta \overline{Ne}_1$ and $\Delta \overline{Ne}_2$ is greater than a predetermined value Nadv, determines whether $\Delta \overline{Ne}_1$ is greater than $\Delta \overline{Ne}_2$ when $|\Delta NE1| > Nadv$, adds a first correction quantity AdvA of the ignition timing which corrects an unbalanced state of first and second cylinders by $\Delta Adv$, when $\Delta \overline{Ne}_1 < \Delta \overline{Ne}_{j2}$, and subtracts $\Delta Adv$ from the first correction quantity, when $\Delta \overline{Ne}_1 > \Delta \overline{Ne}_2$.

7. A system as set forth in claim 6, wherein when $|\Delta NE1| \leq NAdv$, the fifth means determines whether an absolute value of a difference between the average values in the third and fourth cylinders is greater than the predetermined value Nadv, determines whether $\Delta \overline{Ne}_3$ is greater than $\Delta \overline{Ne}_4$ when $|\Delta NE2| > Nadv$, adds a second correction quantity AdvB of the ignition timing which corrects the unbalanced state between the third and fourth cylinders by $\Delta Adv$, when $\Delta \overline{Ne}_3 < \Delta \overline{Ne}_4$, and subtracts Adv from the second correction quantity, when $\Delta \overline{Ne}_3 > \Delta \overline{Ne}_4$.

8. A system as set forth in claim 7, wherein when $|\Delta NE2| \leq Nadv$, the fifth means determines whether an absolute value $|\Delta NCYL|$ of a difference between an average value $\Delta NCYL1$ of $\Delta \overline{Ne}$ in a first group having the first and second cylinders and an average value $\Delta NCYL2$ of $\Delta \overline{Ne}$ in a second group having the third and fourth cylinders is greater than the predetermined value Nadv, determines whether $\Delta NCYL1$ is greater than $\Delta NCYL2$ when $|\Delta NCYL| > Nadv$, and adds a third correction quantity AdvE of the ignition timing which corrects an unbalanced state in the corresponding cylinder group by $\Delta Adv$ when $\Delta NCYL1 < \Delta NCYL2$, $AdvE \leftarrow AdvE + \Delta Adv$, subtracts $\Delta Adv$ from the third correction quantity AdvE when $\Delta NCYL1 > \Delta NCYL2$, $AdvE \leftarrow AdvE + \Delta Adv$.

9. A system as set forth in claim 8, wherein when $|\Delta NCYL| < Nadv$, the sixth means derives fourth correction quantities for the respective cylinders in such way that in the fourth quantity for the first cylinder, the first correction quantity is added, $DAdv1 \leftarrow AdvA + AdvE$, in the fourth correction quantity for the second cylinder, the first correction quantity is subtracted, $DAdv2 \leftarrow (-AdvA) + AdvE$, in the fourth correction quantity for the third cylinder, the second correction quantity is added, DAdv4←AdvB−AdvE, and in the fourth correction quantity for the fourth cylinder, the second correction quantity is subtracted, DAdv-4←(−AdvB)−AdvE.

10. A system as set forth in claim 9, wherein the fifth means compares the average values of $\Delta Ne$ in first and second cylinders, determines whether an absolute value, of a difference between the average values $\Delta \overline{Ne}_1$ and $\Delta \overline{Ne}_2$ is greater than a predetermined value Nadv, determines whether $\Delta \overline{Ne}_1$ is greater than $\Delta \overline{Ne}_2$ when $|\Delta NE1| > Nadv$, adds a fifth correction quantity FueA of fuel injection quantity which corrects an unbalanced state of first and second cylinders by Fue, FueA←FueA+$\Delta$Fue, when $\Delta \overline{Ne}_1 < \Delta \overline{Ne}_2$, and subtracts $\Delta$Fue from the fifth correction quantity, FueA←FueA−$\Delta$Fue, when $Ne_1 > Ne_2$.

11. A system as set forth in claim 10, wherein when $|\Delta NE1| \leq NAdv$, the fifth means determines whether an absolute value of a difference between the average values in the third and fourth cylinders is greater than the predetermined value Nadv, $|\Delta \overline{Ne}_3 − \Delta \overline{Ne}_4| = |\Delta NE2|$, determines whether $\Delta \overline{Ne}_3$ is greater than $\Delta \overline{Ne}_4$ when $\oplus \Delta NE2| > Nadv$, adds a sixth correction quantity FueB of the fuel injection quantity which corrects the unbalanced state between the third and fourth cylinders by $\Delta$Fue, FueB←FueB+$\Delta$Fue, when $\Delta \overline{Ne}_3 < \Delta \overline{Ne}_4$, and subtracts $\Delta$Fue from the sixth correction quantity, FueB ←FueB−$\Delta$Fue, when $\Delta \overline{Ne}_3 > \Delta \overline{Ne}_4$.

12. A system as set forth in claim 11, wherein when $|NE2| \leq Nadv$, the fifth means determines whether an absolute value $|\Delta NCYL|$ of a difference between an average value $\Delta NCYL1$ of $\Delta Ne$ in the first group having the first and second cylinders and an average value $\Delta NCYL2$ of $\Delta Ne$ in the second group having the third and fourth cylinders is greater than the predetermined value Nadv, determines whether $\Delta NCYL1$ is greater than $\Delta NCYL2$ when $|\Delta NCYL| > Nadv$, and adds a seventh correction quantity FueE of the ignition timing which corrects an unbalanced state in the corresponding cylinder group by Fue when $\Delta NCYL1 < \Delta NCYL2$, FueE←FueE+$\Delta$Fue, subtracts $\Delta$Fue from the third correction quantity FueE when $\Delta NCYL1 > \Delta NCYL2$ FueE←FueE+$\Delta$Fue.

13. A system as set forth in claim 12, wherein when $|\Delta NCYL| < Nadv$, the sixth means derives eighth correction quantities for the respective cylinders in such way that in the eighth quantity for the first cylinder, the sixth correction quantity is added, DFuel ←FueA+FueE, in the eighth correction quantity for the second cylinder, the sixth correction quantity is subtracted, DFue2←(−FueA)+FueE, in the eighth correction quantity for the third cylinder, the seventh correction quantity is added, DFue4←FueB−FueE, and in the eighth correction quantity for the fourth cylinder, the seventh correction quantity is subtracted, DFue4←(−FueB)−FueE.

14. A system as set forth in claim 5, wherein the number of engine cylinders is six.

15. A system as set forth in claim 5, wherein the number of engine cylinders is eight.

16. A system for controlling a combustion state for an internal combustion engine during engine idling, comprising:
(a) first means for detecting engine operating conditions;
(b) second means for detecting an engine idling state;
(c) third means for detecting rotations of an engine crankshaft, the third means outputting a first signal by which a cylinder in a combustion stroke is identified by a number and a second signal corresponding to a predetermined unit crank angle;
(d) fourth means for measuring an angular speed for a certain interval whenever a predetermined crank angle is reached and detecting a combustion state of one of the cylinders in the combustion stroke according to a change in the angular speed when the engine is idling;
(e) fifth means for dividing the engine cylinders into a plurality of cylinder groups, each group having a pair of the engine cylinders, for comparing angular speeds in each pair of the engine cylinders, for correcting at least one of ignition timing and fuel injection quantity so that the angular speed of a pair of cylinders which is higher than that of at least one other cylinder group is reduced and, for a pair of cylinders in which the angular speed is slower, correcting at least one of ignition timing and fuel injection quantity in the reverse direction to the corrected at least one of ignition timing and fuel injection quantity by the same quantity so that a balance between the angular speeds in the pairs of the cylinders is taken;
(f) sixth means for comparing the angular speeds in the cylinder groups, for correcting at least one of the ignition timing and fuel injection quantity so that the angular speed of the one cylinder group in which the angular speed is higher than that in at least one other cylinder group is reduced and, for the group of the cylinders in which the angular speed is slower, correcting at least one of the ignition timing and fuel injection quantity in the reverse direction to the corrected at least one of ignition timing and fuel injection quantity by the same quantity, so that a balance in the angular speed between the cylinder groups is taken, the fifth and sixth means correcting the ignition timing and fuel injection quantity so that a total sum of the correction quantities for all cylinders in the case of the at least one of ignition timing and fuel injection quantity always becomes zero.

17. A method for controlling a combustion state for an internal combustion engine during engine idling, comprising the steps of:
(a) detecting engine operating conditions;
(b) detecting an engine idling state;
(c) detecting rotations of an engine crankshaft, the third means outputting a first signal by which a cylinder number in a combustion stroke is identified and a second signal corresponding to a predetermined unit crank angle;
(d) measuring an angular speed for a certain interval whenever a predetermined crank angle is reached and detecting a combustion state of one of the cylinders in the combustion stroke according to a change in the angular speed when the engine is idling;
(e) dividing the engine cylinders into a plurality of cylinder groups, each group having a pair of the engine cylinders, for comparing angular speeds in each pair of the engine cylinders, for correcting at least one of ignition timing and fuel injection quantity so that the angular speed of a pair of cylinders which is higher than that of at least on other cylinder group is reduced and, for a pair of cylinders in which the angular speed is slower, correcting the at least one of ignition timing and fuel injection quantity in the reverse direction to the corrected at least one of ignition timing and fuel injection quantity by the same quantity so that a balance between the angular speeds in the pairs of the cylinders is taken;

(f) comparing the angular speeds of all cylinder groups, for correcting the at least one of ignition timing and fuel injection quantity so that the angular speed of a cylinder group in which the angular speed is higher than that of another cylinder group is reduced and, for a cylinder group in which the angular speed is slower, correcting the at least one of ignition timing and fuel injection quantity in the reverse direction by the same quantity, so that a balance in the angular speed among all cylinder groups is achieved, the steps (e) and (f) correcting the ignition timing and fuel injection quantity so that the total sum of the correction quantities for all cylinders always becomes zero.

* * * * *